(12) United States Patent
Westnedge et al.

(10) Patent No.: US 9,157,529 B2
(45) Date of Patent: Oct. 13, 2015

(54) PISTON FOR AN AIR SPRING OF A HEAVY-DUTY VEHICLE

(75) Inventors: Andrew J. Westnedge, Bolingbrook, IL (US); Dmitriy Enrikovich Rubalskiy, Glenview, IL (US); Michael J. Keeler, Naperville, IL (US)

(73) Assignee: HENDRICKSON USA, L.L.C., Itasca, IL (US)

( * ) Notice: Subject to any disclaimer, the term of this patent is extended or adjusted under 35 U.S.C. 154(b) by 613 days.

(21) Appl. No.: 13/473,109

(22) Filed: May 16, 2012

(65) Prior Publication Data

US 2012/0291626 A1 Nov. 22, 2012

Related U.S. Application Data

(60) Provisional application No. 61/486,857, filed on May 17, 2011.

(51) Int. Cl.
| | |
|---|---|
| *F16F 9/05* | (2006.01) |
| *F16J 3/06* | (2006.01) |
| *B60G 9/00* | (2006.01) |
| *B60G 11/27* | (2006.01) |

(52) U.S. Cl.
CPC . *F16J 3/06* (2013.01); *B60G 9/003* (2013.01); *B60G 11/27* (2013.01); *F16F 9/057* (2013.01); *B60G 2300/02* (2013.01)

(58) Field of Classification Search
CPC ............... F16F 9/04; F16F 9/05; F16F 9/057; F16F 9/0454; B60G 11/27; B60G 17/052; B60G 17/0521; B60G 2202/152; B60G 2206/424; B60G 2204/126

USPC ............. 267/293, 64.19, 64.21, 64.23, 64.24, 267/64.27
See application file for complete search history.

(56) References Cited

U.S. PATENT DOCUMENTS

| | | | |
|---|---|---|---|
| 2,979,326 | A | 2/1957 | Wilson |
| 5,234,203 | A | 8/1993 | Smith |
| 5,382,006 | A | 1/1995 | Arnold |
| 5,954,316 | A | 9/1999 | Voss |
| 6,386,524 | B1 | 5/2002 | Levy et al. |
| 2006/0186586 | A1 | 8/2006 | Soles et al. |
| 2006/0226586 | A1 | 10/2006 | Levy |
| 2008/0246198 | A1 | 10/2008 | Levy et al. |
| 2011/0049774 | A1 | 3/2011 | Naber |

FOREIGN PATENT DOCUMENTS

| | | |
|---|---|---|
| EP | 0080561 A1 | 8/1982 |
| EP | 0914976 A1 | 5/1999 |
| EP | 1300264 A2 | 4/2003 |
| EP | 1862335 A1 | 12/2007 |
| GB | 2333576 A | 2/1998 |
| WO | 2007104671 A1 | 9/2007 |

*Primary Examiner* — Robert A Siconolfi
*Assistant Examiner* — Vu Q Nguyen
(74) *Attorney, Agent, or Firm* — Dureska, Kennedy & Moore, L.L.C.; David P. Dureska; Brent L. Moore (57) ABSTRACT

A piston for an air spring of a heavy-duty vehicle includes a sidewall and a central hub. The sidewall and the central hub are attached to a first bottom plate of the piston. A top plate is removeably attached to a top portion of the sidewall and a top portion of the central hub. A bottom portion of said central hub includes a second bottom plate that is recessed relative to the first bottom plate for attachment to a piston mounting pedestal that is in turn mounted to a beam of a suspension assembly of the heavy-duty vehicle.

15 Claims, 8 Drawing Sheets

PISTON FOR AN AIR SPRING OF A HEAVY-DUTY VEHICLE

CROSS-REFERENCE TO RELATED APPLICATION

This application claims the benefit of U.S. Provisional Patent Application Ser. No. 61/486,857, filed May 17, 2011.

BACKGROUND OF THE INVENTION

1. Field of the Invention

The invention relates generally to the art of axle/suspension systems for heavy-duty vehicles. More particularly, the invention relates to air-ride axle/suspension systems for heavy-duty vehicles, which utilize an air spring to cushion the ride of the vehicle. More specifically, the invention is directed to a piston for an air spring of a heavy-duty vehicle air-ride axle/suspension system, in which the air spring piston upper portion is formed in two parts, including a top plate and a continuous stepped sidewall. Forming the top plate as a discrete part from the continuous stepped sidewall allows for more efficient manufacture of the air spring piston. A downwardly extending piston bottom plate allows for increased piston volume, which in turn provides a reduced spring rate, and/or better damping characteristics to the air spring.

2. Background Art

The use of air-ride trailing and leading arm rigid beam-type axle/suspension systems has been popular in the heavy-duty truck and tractor-trailer industry for many years. Although such axle/suspension systems can be found in widely varying structural forms, in general their structure is similar in that each system typically includes a pair of suspension assemblies. In some heavy-duty vehicles, the suspension assemblies are connected directly to the primary frame of the vehicle. In other heavy-duty vehicles, the primary frame of the vehicle supports a subframe, and the suspension assemblies connect directly to the subframe. For those heavy-duty vehicles that support a subframe, the subframe can be non-movable or movable, the latter being commonly referred to as a slider box, slider subframe, slider undercarriage, or secondary slider frame. For the purpose of convenience and clarity, reference herein will be made to main members, with the understanding that such reference is by way of example, and that the present invention applies to heavy-duty vehicle axle/suspension systems suspended from main members of: primary frames, movable subframes and non-movable subframes.

Specifically, each suspension assembly of an axle/suspension system includes a longitudinally extending elongated beam. Each beam typically is located adjacent to and below a respective one of a pair of spaced-apart longitudinally extending main members and one or more cross members, which form the frame of the vehicle. More specifically, each beam is pivotally connected at one of its ends to a hanger, which in turn is attached to and depends from a respective one of the main members of the vehicle. An axle extends transversely between and typically is connected by some means to the beams of the pair of suspension assemblies at a selected location from about the mid-point of each beam to the end of the beam opposite from its pivotal connection end. The opposite end of each beam also is connected to an air spring, or its equivalent, which in turn is connected to a respective one of the main members. A height control valve is mounted on the hanger or other support structure and is operatively connected to the beam and to the air spring in order to maintain the ride height of the vehicle. A brake system and one or more shock absorbers for providing additional damping to the vehicle axle/suspension system are also included. The beam may extend rearwardly or frontwardly from the pivotal connection relative to the front of the vehicle, thus defining what are typically referred to as trailing arm or leading arm axle/suspension systems, respectively. However, for purposes of the description contained herein, it is understood that the term "trailing arm" will encompass beams, which extend either rearwardly or frontwardly with respect to the front end of the vehicle.

The axle/suspension systems of the heavy-duty vehicle act to cushion the ride, dampen vibrations and stabilize the vehicle. More particularly, as the vehicle is traveling over the road, its wheels encounter road conditions that impart various forces, loads, and/or stresses, collectively referred to herein as forces, to the respective axle on which the wheels are mounted, and in turn, to the suspension assemblies that are connected to and support the axle. In order to minimize the detrimental affect of these forces on the vehicle as it is operating, the axle/suspension system is designed to react and/or absorb at least some of them.

These forces include vertical forces caused by vertical movement of the wheels as they encounter certain road conditions, fore-aft forces caused by acceleration and deceleration of the vehicle, and side-load and torsional forces associated with transverse vehicle movement, such as turning of the vehicle and lane-change maneuvers. In order to address such disparate forces, axle/suspension systems have differing structural requirements. More particularly, it is desirable for an axle/suspension system to be fairly stiff in order to minimize the amount of sway experienced by the vehicle and thus provide what is known in the art as roll stability. However, it is also desirable for an axle/suspension system to be relatively flexible to assist in cushioning the vehicle from vertical impacts, and to provide compliance so that the components of the axle/suspension system resist failure, thereby increasing durability of the axle/suspension system. It is also desirable to dampen the vibrations or oscillations that result from such forces. A key component of the axle/suspension system that cushions the ride of the vehicle from vertical impacts is the air spring, while a shock absorber typically provides additional damping to the axle/suspension system.

The typical air spring of the type utilized in heavy-duty air-ride axle/suspension systems includes three main components, a flexible bellows, a bellows top plate and a piston. The bellows is typically formed from rubber or other flexible material, and is sealingly engaged with the bellows top plate and also to the top portion of the piston. The volume of pressurized air, or "air volume", that is contained within the air spring is a major factor in determining the spring rate of the air spring. More specifically, this air volume is contained within the bellows and, in some cases, the piston of the air spring. The larger the air volume of the air spring, the lower the spring rate of the air spring. A lower spring rate is generally more desirable in the heavy-duty vehicle industry because it allows for softer ride characteristics for the vehicle. Typically, the piston either contains a hollow cavity, which is in communication with the bellows and which adds to the air volume of the air spring by allowing unrestricted communication of air between the piston and the bellows volumes, or the piston has a generally hollow cylindrical-shape and does not communicate with the bellows volume, whereby the piston does not contribute to the air volume of the air spring. The air volume of the air spring is in fluid communication with an air source, such as an air supply tank, and also is in fluid communication with the height control valve of the vehicle. The height control valve, by directing air flow into and out of the air spring of the axle/suspension system, helps maintain the desired ride height of the vehicle.

The prior art air spring piston is generally cylindrically shaped and includes a continuous generally stepped sidewall attached to a generally flat bottom plate. A top plate is formed at the top of the piston. The bottom plate is formed with an upwardly extending central hub. The central hub includes a bottom plate formed with one or more central openings. A fastener is disposed through the openings in the central hub bottom plate in order to attach the piston to the beam of the suspension assembly at its rear end. The top plate, sidewall and bottom plate of the piston define a piston chamber having an interior volume. The top plate of the piston is formed with a circular upwardly extending protrusion having a lip or barb around its circumference. The barb cooperates with the lowermost end of the air spring bellows to form an airtight seal between the bellows and the piston. A bumper is attached to a bumper mounting plate, which is in turn mounted on the piston top plate by a fastener. The bumper extends upwardly from the top surface of the bumper mounting plate and serves as a cushion between the piston top plate and the bellows top plate in order to cushion contact between the two plates during operation of the vehicle. The piston is typically formed from steel, aluminum, fiber reinforced plastic or other rigid material.

Because the prior art air spring piston typically has a relatively complex integral one-piece structural design, manufacture of the piston from composite materials can be complicated. More particularly, because the lip or barb is integrally formed in one piece on the upwardly extending protrusion, which in turn is integrally formed in one piece with the top plate of the piston, manufacture of the piston from composite materials can be quite complex and therefore inefficient, as is well known to those of ordinary skill in the art. In addition, because the bottom plates of the piston and the central hub, respectively, are generally flat, the volume contained in the piston is generally limited because of spatial limitations between the beam of the suspension assembly and the main member of the vehicle.

The air spring piston for heavy-duty vehicles of the present invention, overcomes the problems associated with prior art air spring piston designs by providing an air spring piston upper portion formed in two parts that are assembled. Moreover, the air spring piston for heavy-duty vehicles of the present invention includes a downwardly extending piston bottom plate that allows for an increased piston volume while still utilizing the same mount configuration and hardware existing in prior art designs. This downwardly extending piston bottom plate allows for an increased piston volume without the need for redesigned or additional mounting brackets and without changing the spatial measurements between the beam and the main member. Therefore, the air spring piston for heavy-duty vehicles of the present invention provides for more efficient and simple manufacture that reduces manufacturing costs and provides for an increased piston chamber volume using existing piston-to-beam mounting hardware, whereby the increased piston chamber volume provides a reduced spring rate and/or better damping characteristics to the air spring.

SUMMARY OF THE INVENTION

Objectives of the present invention include providing a piston for an air spring of a heavy-duty vehicle that is more efficient and simple to manufacture and that reduces manufacturing costs.

A further objective of the present invention is to provide a piston for an air spring of a heavy-duty vehicle that provides increased piston chamber volume using existing piston-to-beam mounting hardware.

Yet another objective of the present invention is to provide a piston for an air spring of a heavy-duty vehicle that provides a reduced spring rate and/or provides improved damping characteristics to the air spring.

These objectives and advantages are obtained by the piston for an air spring of a heavy-duty vehicle of the present invention, which includes a sidewall and a central hub. The sidewall and the central hub are attached to a first bottom plate. A discrete top plate is attached to a top portion of the sidewall and a top portion of the central hub, said top plate including a barb around its circumference.

These objectives and advantages are also obtained by the piston for an air spring of a heavy-duty vehicle of the present invention, which includes a sidewall and a central hub. The sidewall and the central hub attached to a first bottom plate. A discrete top plate is attached to a top portion of the sidewall and a top portion of the central hub, the top plate extending outwardly beyond the top portion of the sidewall.

BRIEF DESCRIPTION OF THE SEVERAL VIEWS OF THE DRAWINGS

The preferred embodiment of the present invention, illustrative of the best mode in which applicants have contemplated applying the principles, is set forth in the following description and is shown in the drawings, and is particularly and distinctly pointed out and set forth in the appended claims.

Similar numerals refer to similar parts throughout the drawings.

DESCRIPTION OF THE PREFERRED EMBODIMENT

Figure 1:
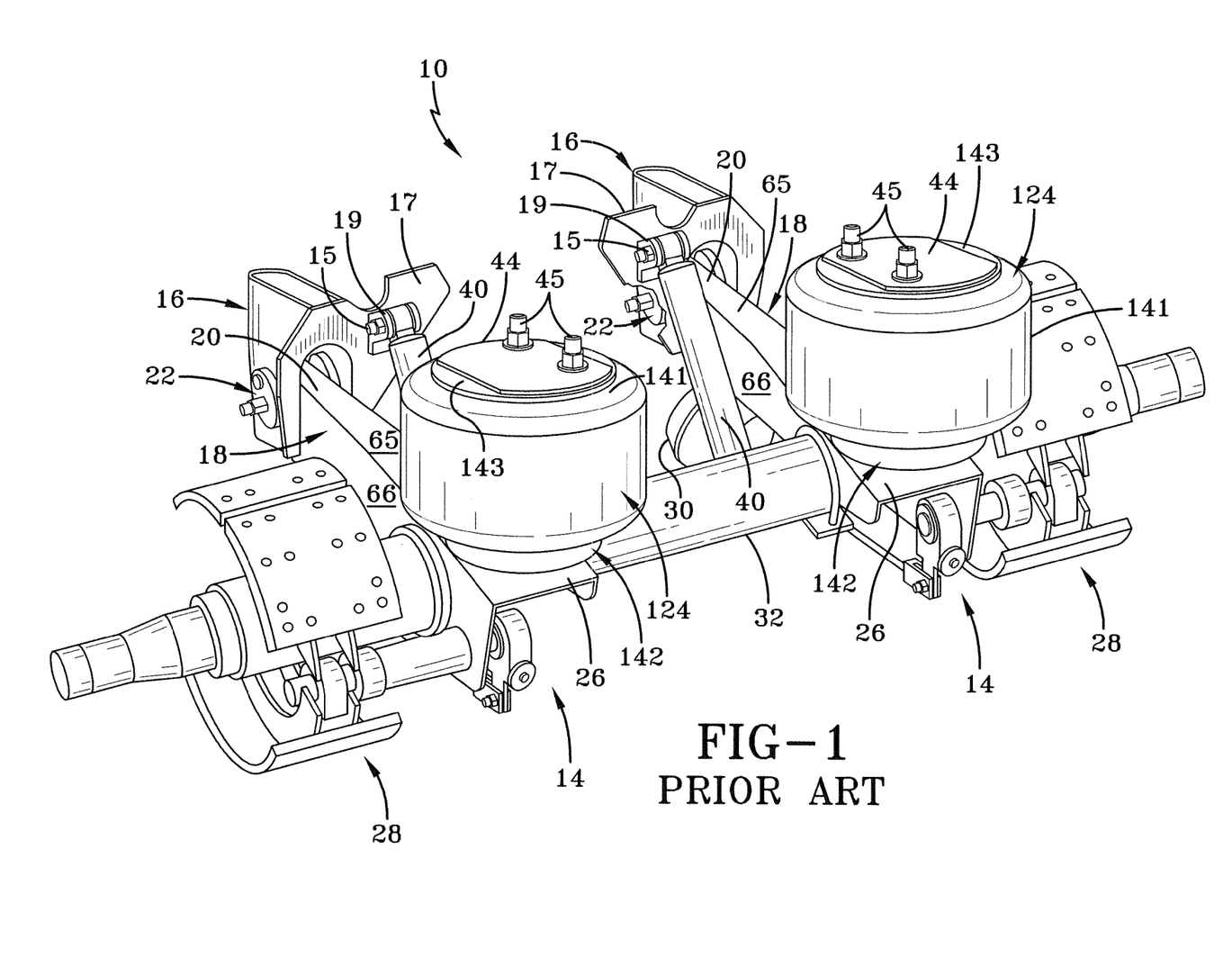
FIG. 1 is a top rear perspective view of a heavy-duty trailer axle/suspension system incorporating a pair of prior art air springs, with each one of the pair of air springs mounted on a respective one of the suspension assemblies of the axle/suspension system.

In order to better understand the environment in which the air spring piston for heavy-duty vehicles of the present invention is utilized, a trailing arm overslung beam-type air-ride axle/suspension system that incorporates a prior art heavy-duty vehicle trailer air spring 124, is indicated generally at 10, is shown in FIG. 1, and now will be described in detail below.

It should be noted that axle/suspension system 10 is typically mounted on a pair of longitudinally-extending spaced-apart main members (not shown) of a heavy-duty vehicle, which is generally representative of various types of frames used for heavy-duty vehicles, including primary frames that do not support a subframe and primary frames and/or floor structures that do support a subframe. For primary frames and/or floor structures that do support a subframe, the subframe can be non-movable or movable, the latter being commonly referred to as a slider box. Because axle/suspension system 10 generally includes an identical pair of suspension assemblies 14, for sake of clarity only one of the suspension assemblies will be described below.

Suspension assembly 14 is pivotally connected to a hanger 16 via a trailing arm overslung beam 18. More specifically, beam 18 is formed having a generally upside-down integrally formed U-shape with a pair of sidewalls 66 and a top plate 65, with the open portion of the beam facing generally downwardly. A bottom plate 63 (FIG. 2A) extends between and is attached to the lowermost ends of sidewalls 66 by any suitable means such as welding to complete the structure of beam 18. Trailing arm overslung beam 18 includes a front end 20 having a bushing assembly 22, which includes a bushing, pivot bolts and washers as are well known in the art, to facilitate pivotal connection of the beam to hanger 16. Beam 18 also includes a rear end 26, which is welded or otherwise rigidly attached to a transversely-extending axle 32.

Suspension assembly 14 also includes the top end of a shock absorber 40 mounted on an inboardly extending wing 17 of hanger 16 via a mounting bracket 19 and a fastener 15, in a manner well known in the art. The bottom end of shock absorber 40 is mounted to beam 18 (the mount not shown) in a manner well known to those having skill in the art. For the sake of relative completeness, a brake system 28 including a brake chamber 30 is shown mounted on prior art suspension assembly 14.

As mentioned above, axle/suspension system 10 is designed to absorb forces that act on the vehicle as it is operating. More particularly, it is desirable for axle/suspension system 10 to be rigid or stiff in order to resist roll forces and thus provide roll stability for the vehicle. This is typically accomplished by using beam 18, which is rigid, and also is rigidly attached to axle 32. It is also desirable, however, for axle/suspension system 10 to be flexible to assist in cushioning the vehicle (not shown) from vertical impacts and to provide compliance so that the axle/suspension system resists failure. Such flexibility typically is achieved through the pivotal connection of beam 18 to hanger 16 with bushing assembly 22. Air spring 124 and shock absorber 40 also assist in cushioning the ride for cargo and passengers.

More specifically, prior art air spring 124 shown in FIG. 2 now will be described in detail. Air spring 124 is typically incorporated into an axle/suspension system such as axle/suspension system 10, or other similar air-ride axle/suspension system. Air spring 124 includes a bellows 141, a bellows top plate 143 and a piston 142. The top end of bellows 141 is sealingly engaged with bellows top plate 143 in a manner well known in the art. An air spring mounting plate 44 (FIG. 1) is typically mounted on the top surface of top plate 143 by fasteners 45 which are also used to mount the top portion of air spring 124 to a respective one of the main members (not shown) of the vehicle. Alternatively, bellows top plate 143 could also be mounted directly on a respective one of the main members (not shown) of the vehicle. Piston 142 is generally cylindrical-shaped and includes a continuous generally stepped sidewall 144 attached to a generally flat bottom plate 150 and integrally formed in one piece with a top plate 182. Bottom plate 150 is formed with an upwardly-extending central hub 152 and is attached to sidewall 144 in a well known manner. Central hub 152 includes a bottom plate 154 formed with a central opening 153. A fastener 151 is disposed through opening 153 in order to attach piston 142 to a beam mounting pedestal 130 (FIG. 2A), of a type that is well known in the beam-air spring mounting art.

Figure 2:
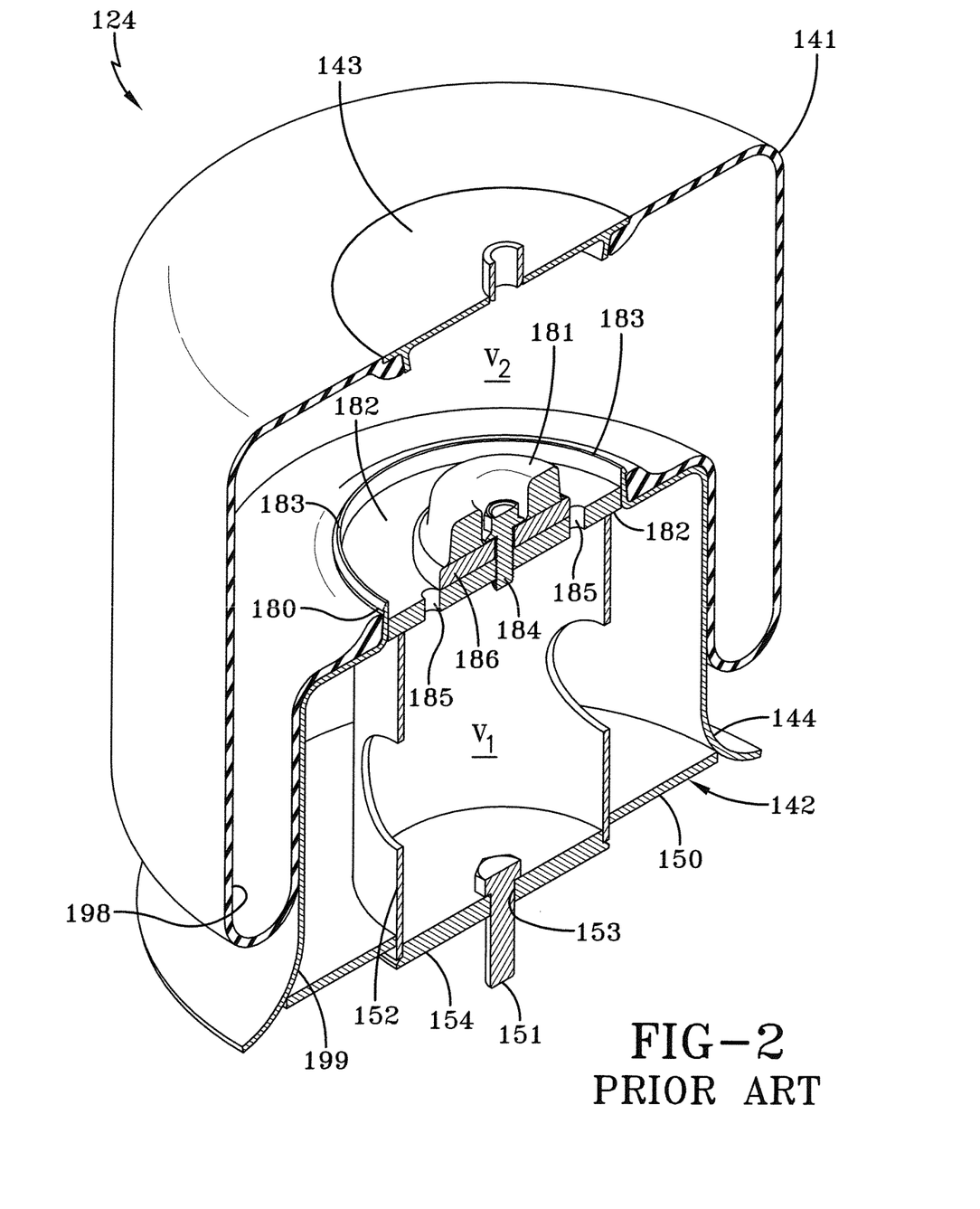
FIG. 2 is a perspective view of a prior art air spring in section, showing the circular upwardly-extending protrusion and lip or barb integrally formed as one-piece with the piston top plate, and showing the generally flat piston bottom plate and flat central hub bottom plate.
Figure 2A:
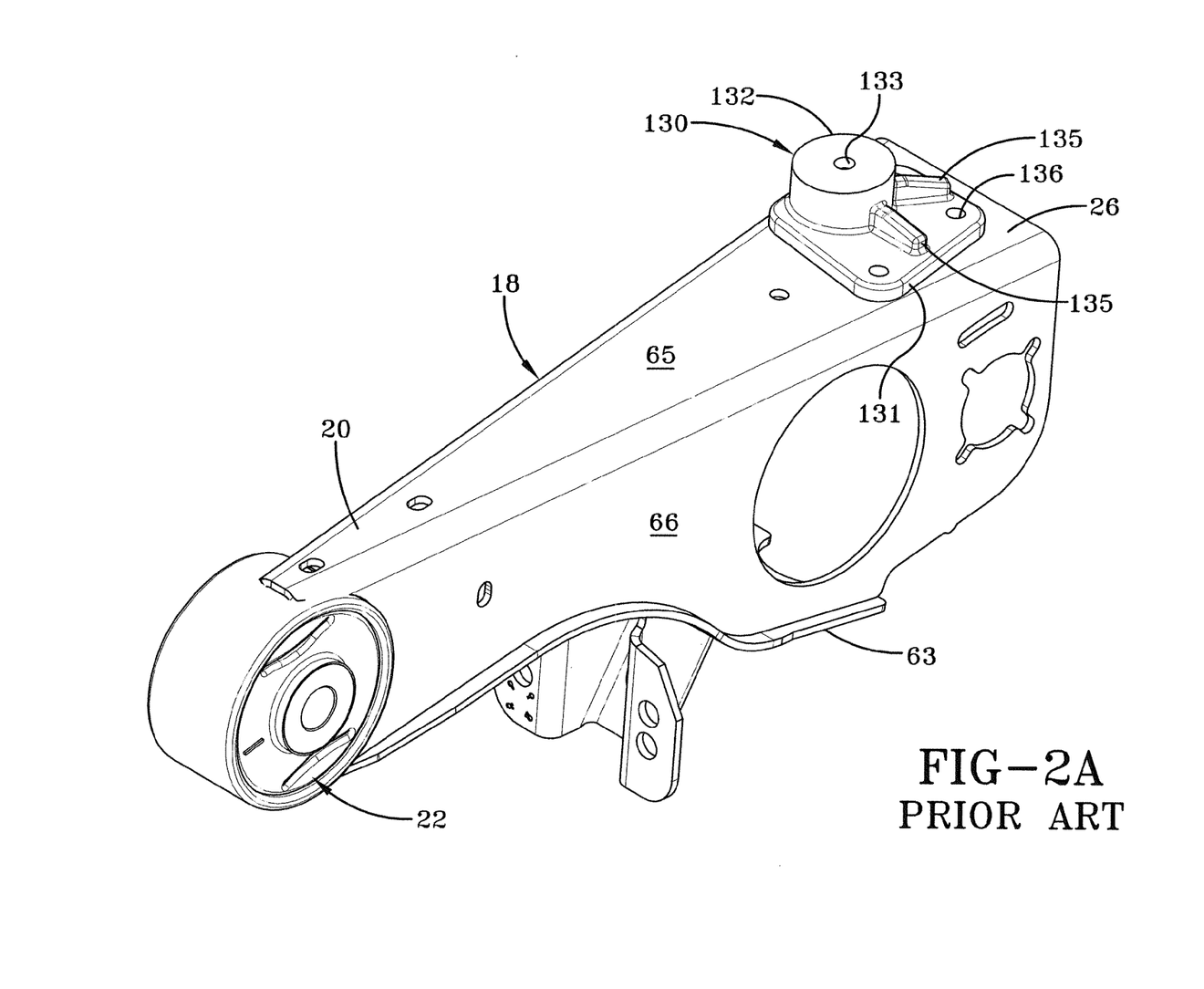
FIG. 2A is a front perspective view of the beam of the driver side suspension assembly shown in FIG. 1, and showing a beam mounting pedestal attached to the top plate of the beam for mounting the air spring on the suspension assembly.

With additional reference to FIG. 2A, beam mounting pedestal 130 includes a generally flat base 131 for contacting and seating on beam top plate 65 at beam rear end 26. Beam mounting pedestal 130 also includes an upwardly extending column 132, which contacts central hub bottom plate 154 of piston 142 of air spring 124. Column 132 is formed with a central generally vertically-extending opening 133, through which fastener 151 is disposed. A lock nut (not shown) is threaded onto a threaded end of fastener 151 in order to attach piston 142 to beam mounting pedestal 130. A pair of strengthening webs 135 are located on column 132 and extend outwardly from the column on flat base 131. An opening 136 is formed in pedestal base 131. Opening 136 receives a fastener (not shown) for attaching pedestal 130 to beam top plate 65 at beam rear end 26. Beam mounting pedestal 130 is typically formed from a rigid material such as steel, aluminum or composite material, as is well known in the art, and may or may not include strengthening webs 135.

With continued reference to FIG. 2, top plate 182, sidewall 144 and bottom plate 150 of piston 142 define a piston chamber 199. Top plate 182 of piston 142 is formed with a circular upwardly extending protrusion 183 having a lip or barb 180 around its circumference. Barb 180 cooperates with the bottom terminal end of bellows 141 to form an airtight seal between the bellows and the barb around the circumference of protrusion 183 of piston 142, as is well known to those of ordinary skill in the art. Bellows 141, top plate 143 and piston top plate 182 define a bellows chamber 198. A bumper 181 is rigidly attached to a bumper mounting plate 186 by means generally well known in the art. Bumper mounting plate 186 is in turn mounted on piston top plate 182 by a fastener 184. Bumper 181 extends upwardly from the top surface of bumper mounting plate 186. Bumper 181 serves as a cushion between piston top plate 182 and the underside of bellows top plate 143 in order to prevent the plates from damaging one another in the event that the piston top plate and the underside of the bellows top plate contact one another during operation of the vehicle. Manufacture of piston 142 from composite materials can be quite complicated and therefore inefficient, as is well known to those of ordinary skill in the art.

Piston top plate 182 is formed with a pair of openings 185, which allow the volume of piston chamber 199 and the volume of bellows chamber 198 to communicate with one another. More particularly, openings 185 allow fluid or air to pass between piston chamber 199 and bellows chamber 198 during operation of the vehicle.

Figure 2B:
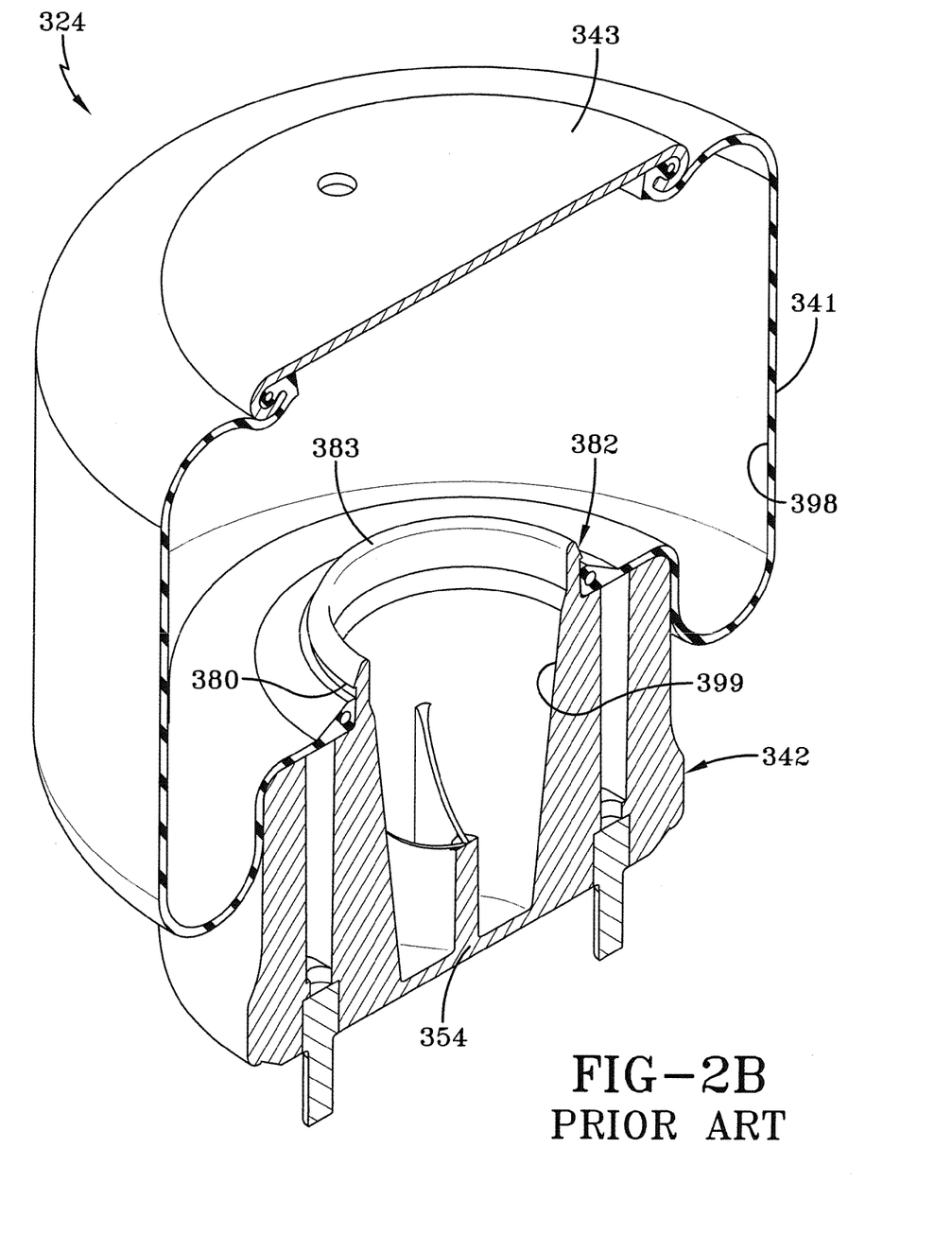
FIG. 2B is a sectional perspective view of a prior art air spring for a truck axle/suspension system, showing the upwardly-extending protrusion and lip or barb integrally formed as one-piece and showing the generally flat bottom plate.

Turning now to FIG. 2B, a prior art air spring for a truck axle/suspension system is shown generally at 324. Air spring 324 generally includes a bellows 341, a bellows chamber 389, a bellows top plate 343, a piston chamber 399 and a piston 342. Piston 342 is formed with a generally flat bottom plate 354 and an open top plate 382 having an upwardly-extending protrusion 383 formed with a lip or barb 380. Piston 342 includes a hollow piston chamber 399, which is in fluid communication with bellows 341 and allows unrestricted communication of air between the piston cavity and the bellows. Because prior art air spring piston 342 has an integral one-piece structural design, manufacture of the piston from composite materials can be complicated. More particularly, because lip 380 is integrally formed in one-piece on upwardly-extending protrusion 383, manufacture of the piston from composite materials can be quite complicated and therefore inefficient, as is well known to those of ordinary skill in the art.

Figure 2C:
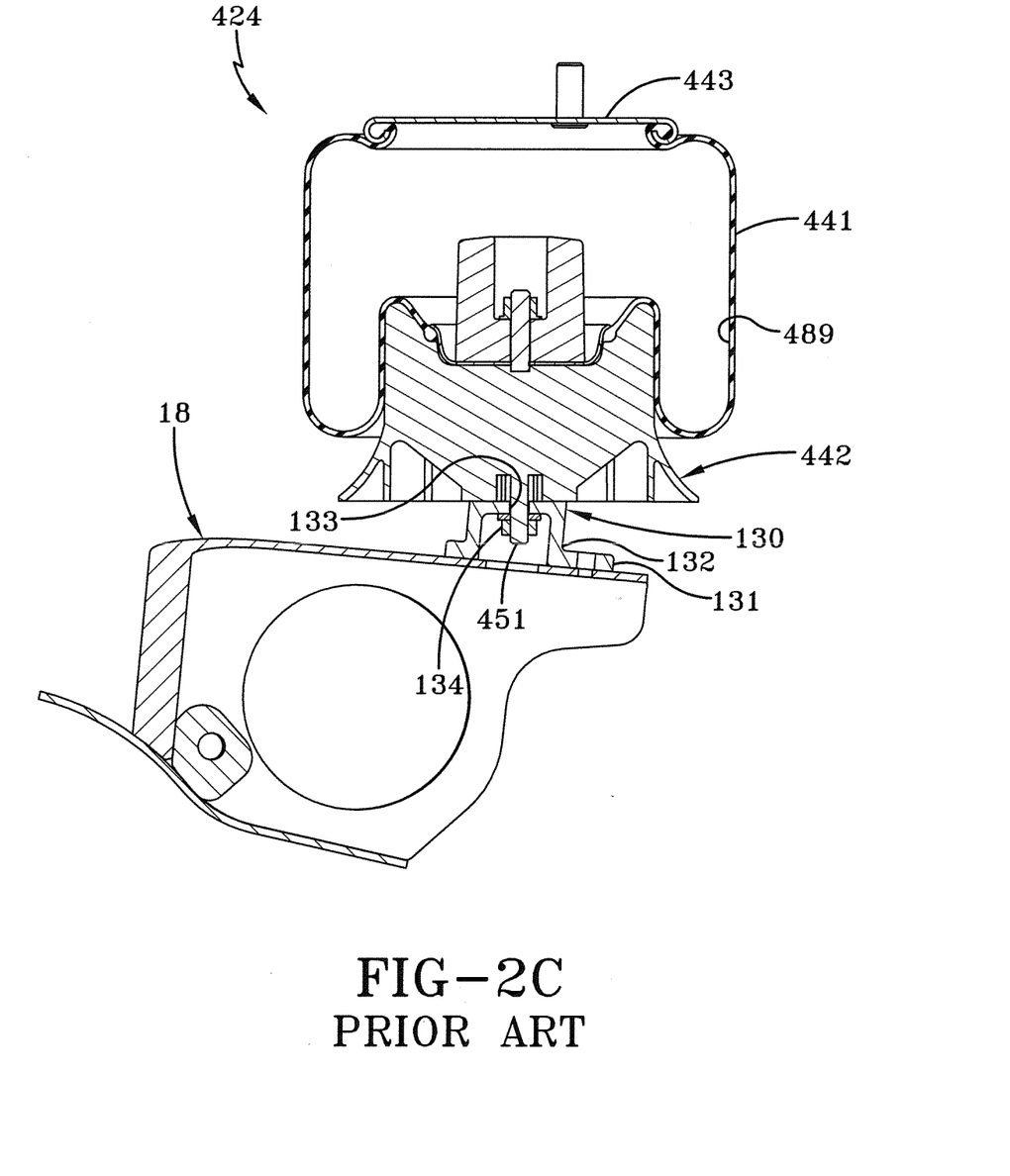
FIG. 2C is a fragmentary sectional perspective view of another prior art air spring for a heavy-duty trailer, showing the air spring piston mounted on a conventional beam mounting pedestal and beam of the axle/suspension system.

Turning now to FIG. 2C, another example of a prior art air spring for an axle/suspension system is shown generally at 424. Air spring 424 generally includes a bellows 441, a bellows top plate 443 and a piston 442. Piston 442 is mounted on suspension assembly beam 18 by fastener 451 disposed through conventional beam mounting pedestal 130, described in detail above. Air spring 424 is representative of an air spring configuration different from prior art air springs 124 and 324, whereby piston 442 does not contribute to the air volume of the air spring and which still utilizes conventional beam mounting pedestal 130 in the field, i.e. no piston chamber, only a bellows chamber 489.

As set forth above, because prior art air spring pistons 142,342 have a relatively complex integral one-piece structural design, manufacture of the pistons from a composite material can be complicated. More particularly, because lip or barb 180,380 is integrally formed on upwardly extending protrusion 183,382, respectively, which in turn is integrally formed with top plate 182 of piston 142 and top plate 382 of piston 342, respectively, manufacture of the piston from composite materials can be quite complex and therefore inefficient as is known to those of ordinary skill in the art. The air spring piston of the present invention overcomes the problems associated with prior art air spring pistons 142,342, and will now be described in detail below.

Figure 3:
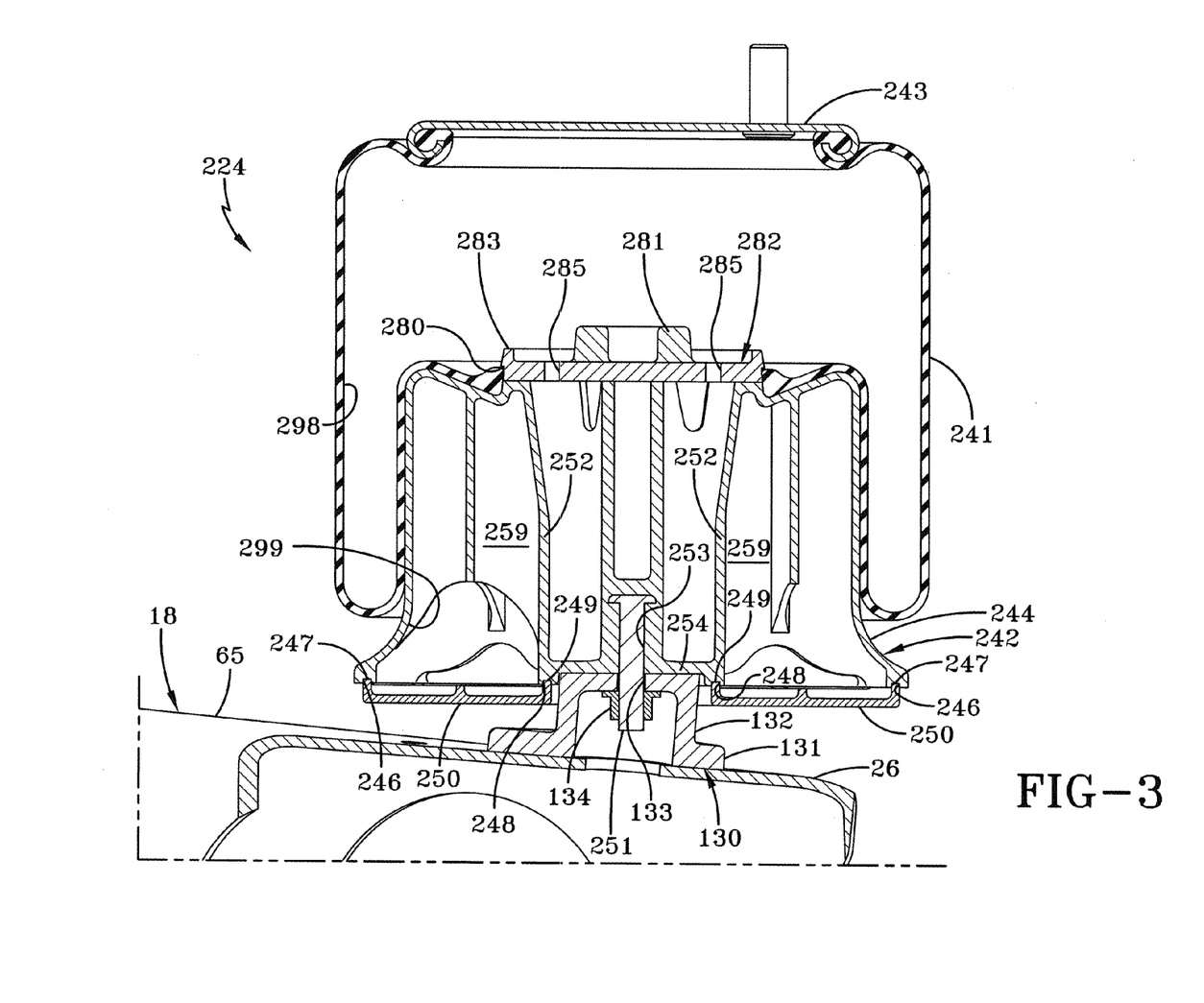
FIG. 3 is a fragmentary perspective sectional view of a preferred embodiment air spring piston of the present invention incorporated into an air spring for an axle/suspension system of a heavy-duty vehicle, shown mounted on a conventional beam mounting pedestal and beam of an axle/suspension system.
Figure 4:
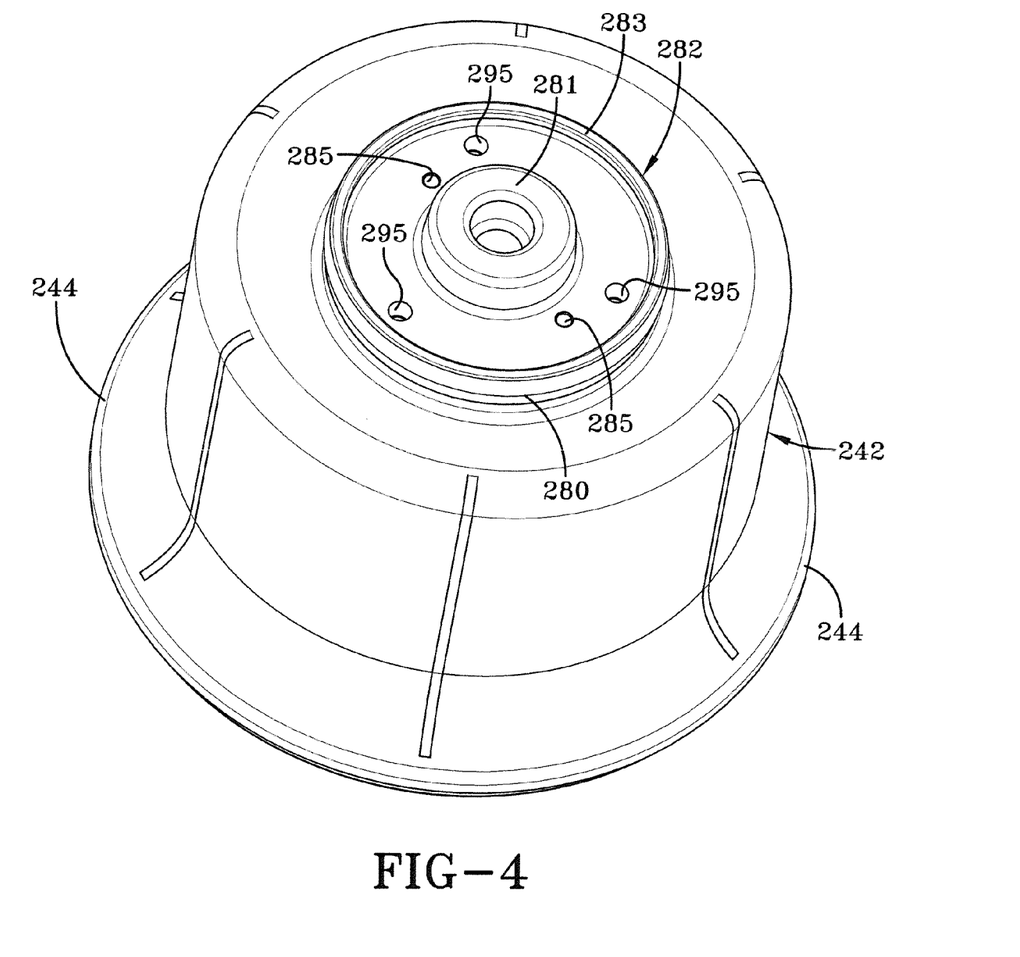
FIG. 4 is a perspective view of the preferred embodiment air spring piston of the present invention shown in FIG. 3.
Figure 5:
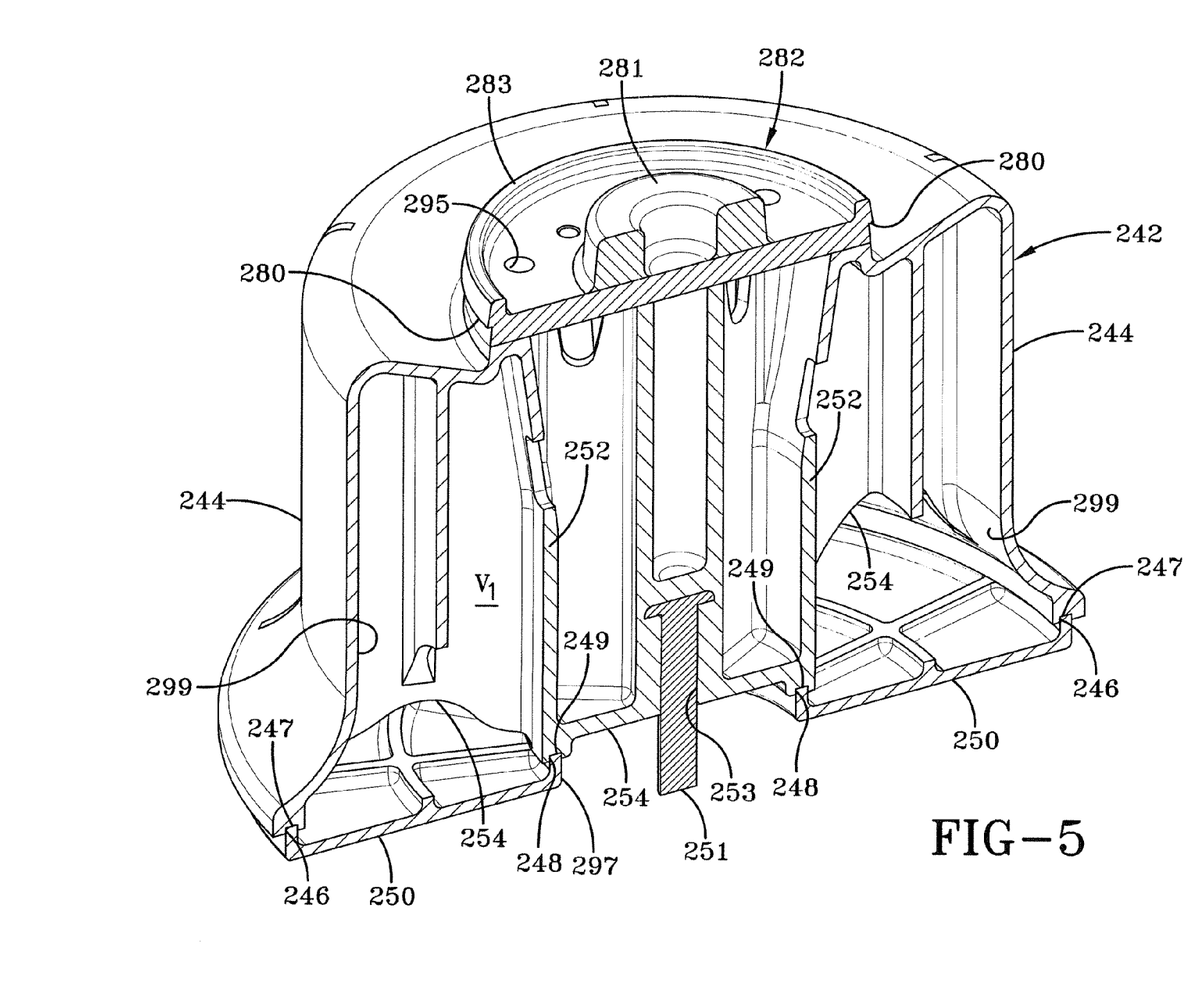
FIG. 5 is a perspective sectional view of the preferred embodiment air spring piston of the present invention shown in FIG. 4.

A preferred embodiment air spring piston of the present invention is shown generally at 242 in FIGS. 3-5, with FIG. 3 showing the air spring piston of the present invention incorporated into an air spring 224 of an axle/suspension system (not shown), and now will be described in detail below.

In accordance with one of the primary features of the present invention, air spring 224 includes a bellows 241, a bellows top plate 243 and preferred embodiment air spring piston 242 of the present invention. The top end of bellows 241 is sealingly engaged with bellows top plate 243 in a manner well known in the art. An air spring mounting plate (not shown) is mounted on the top surface of top plate 243 by fasteners (not shown) which are also used to mount the top portion of air spring 224 to a respective one of the main members (not shown) of the vehicle frame. Alternatively, bellows top plate 243 could also be mounted directly on a respective one of the main members (not shown) of the vehicle.

In accordance with another important feature of the present invention, air spring 224 includes air spring piston 242, which is generally cylindrical-shaped and includes a continuous generally stepped sidewall 244 and a central hub 252, each attached to a generally downwardly extending flat bottom plate 250 and a discrete top plate 282. More particularly, the lower end of sidewall 244 is formed with a groove 246, which receives a correspondingly shaped outer tongue 247 formed on bottom plate 250. The lower end of central hub 252 also is formed with a groove 248, which receives a correspondingly shaped inner tongue 249 formed on bottom plate 250. In this manner, grooves 246,248 and inner and outer tongues 247, 249, respectively, allow bottom plate 250 to be friction welded to piston central hub 252 and piston sidewall 244.

Central hub 252 includes an integrally formed generally flat recessed bottom plate 254 formed with a central opening 253, and which is recessed relative to bottom plate 250. A fastener 251 is disposed through opening 253 in order to attach piston 242 to prior art beam mounting pedestal 130 described above. Beam mounting pedestal 130 includes generally flat base 131 for contacting the beam top plate of its respective suspension assembly. Beam mounting pedestal 130 also includes upwardly extending column 132, which contacts central hub bottom plate 254 (FIG. 3). Column 132 is formed with central opening 133, through which fastener 251 is disposed. Lock nut 134 is threaded onto a threaded end of fastener 151 in order to attach piston 142 to beam mounting pedestal 130. Strengthening webs 135 (not shown in FIG. 3) are located on column 132 and extend outwardly from the column on flat base 131. Opening 136 (not shown in FIG. 3) is formed in pedestal base 131. Base opening 136 receives fastener (not shown in FIG. 3) for attaching pedestal 130 to beam top plate 65 at beam rear end 26. Beam mounting pedestal 130 is typically formed from a rigid material such as steel, aluminum or composite material, as is well known in the art, and may or may not include strengthening webs 135.

Top plate 282 is formed with a plurality of openings 295. Openings 295 (FIGS. 4 and 5) align with openings (not shown) formed in the top portion of piston central hub 252. A fastener (not shown) is disposed through openings 295 and aligned openings (not shown) in the top portion of central hub 252 in order to attach top plate 282 to the piston central hub and piston sidewall 244. Top plate 282, sidewall 244, central hub bottom plate 254, and piston bottom plate 250 define a piston chamber 299. Because piston bottom plate 250 is generally downwardly extending, piston chamber 299 volume is greater than prior art piston chamber 199 volume, shown and described above. Moreover, because piston bottom plate 250 is generally downwardly extending, a recess 297 is formed in piston 242 by a portion of central hub recessed bottom plate 254 and a portion of bottom plate 250. Top plate 282 also is formed with a circular upwardly extending protrusion 283 formed with a lip or barb 280 around its circumference. Barb 280 cooperates with the bottom terminal end of bellows 241 to form an airtight seal between the bellows and the barb, as is well known to those of ordinary skill in the art. It should be understood that top plate 282 could be formed having a larger diameter than central hub 252 such that the outer edge of the top plate would form barb or lip 280, without changing the overall concept or operation of the present invention.

Bellows 241, top plate 243 and top plate 282 define a bellows chamber 298. A bumper 281 is rigidly attached to top plate 282 by adhesive or other means generally well known in the art. Bumper 281 extends upwardly from the top surface of top plate 282. Bumper 281 serves as a cushion between top plate 282 and bellows top plate 243 in order to keep the plates from damaging one another in the event that the piston top plate and the bellows top plate contact one another during operation of the vehicle. A plurality of strengthening webs 259 extend between piston sidewall 244 and piston central hub 253 and between the walls of the central hub itself in order to strengthen piston 242.

Top plate 282 also is formed with a pair of openings 285, which allow the volume of piston chamber 299 and the volume of bellows chamber 298 to communicate with one another. More particularly, openings 285 allow fluid or air to pass between piston chamber 299 and bellows chamber 298 during operation of the vehicle. This communication between piston chamber 299 and bellows chamber 298 through openings 285 provides viscous damping to air spring 224 as described and shown in U.S. patent application Ser. No. 13/228,908, owned by the assignee of the present application.

Improved air spring piston 242 for heavy-duty vehicles of the present invention overcomes the problems associated with prior art air spring pistons 142,342 by providing an air spring piston upper portion, which is formed in two separate parts that are assembled. This two-part assembly provides a top plate 282 that is easier to manufacture than prior art piston top plates that are formed integrally with the rest of the piston. Moreover, air spring piston 242 for heavy-duty vehicles of the present invention includes downwardly extending piston bottom plate 250 that allows for an increased piston chamber 299 volume while still utilizing the same air spring-to-beam mount configuration existing in prior art designs. More particularly, downwardly extending piston bottom plate 250 and recessed central hub bottom plate 254 allow for an increased piston volume while utilizing prior art pedestal 130, without the need for new or additional mounting brackets and without changing the spatial measurements between beam 18 of the axle/suspension system 10 and the main member of the vehicle. Therefore, preferred embodiment air spring piston 242 for heavy-duty vehicles of the present invention provides for more efficient and simple manufacture that reduces manufacturing costs and provides for greater piston chamber 299 volume using existing piston-to-beam mounting hardware, whereby the increased piston volume provides a reduced spring rate and/or better damping characteristics to the air spring.

It is contemplated that preferred embodiment air spring piston 242 of the present invention could be utilized on trucks or tractor-trailers having one or more than one axle without changing the overall concept or operation of the present invention. It is further contemplated that preferred embodiment air spring piston 242 of the present invention could be utilized on vehicles having frames or subframes which are moveable or non-movable without changing the overall concept of the present invention. It is yet even further contemplated that preferred embodiment air spring piston 242 of the present invention could be utilized on all types of air-ride leading and/or trailing arm beam-type axle/suspension system designs known to those skilled in the art without changing the overall concept or operation of the present invention. For example, the present invention finds application with beams or arms that are made of materials other than steel, such as aluminum, other metals, metal alloys, composites, and/or combinations thereof. It is also contemplated that preferred embodiment air spring piston 242 of the present invention could be utilized on axle/suspension systems having either an overslung/top-mount configuration or an underslung/bottom-mount configuration, without changing the overall concept or operation of the present invention. The present invention also finds application in beams or arms with different designs and/or configurations than that shown above, such as solid beams, shell-type beams, truss structures, intersecting plates, spring beams and parallel plates. The present invention also finds application in intermediary structures such as spring seats. It is also contemplated that preferred embodiment air spring piston 242 of the present invention could be utilized in conjunction with other types of air-ride rigid beam-type axle/suspension systems such as those using U-bolts, U-bolt brackets/axle seats and the like, without changing the overall concept or operation of the present invention. It is also contemplated that preferred embodiment air spring piston 242 of the present invention could be formed from various materials, including but not limited to composites, metal and the like, without changing the overall concept or operation of the present invention. It is yet even further contemplated that preferred embodiment air spring piston 242 of the present invention could be utilized with fewer than two or more than two openings 285 such as three, four or even five or more openings without changing the overall concept for operation of the present invention. It is also contemplated that preferred embodiment air spring piston 242 of the present invention could be utilized with any viscous fluid, such as air or hydraulic fluid, without changing the overall concept of the present invention. It is further contemplated that preferred embodiment air spring piston 242 of the present invention could be utilized in combination with prior art shock absorbers and other similar devices and the like, without changing the overall concept of the present invention. It is contemplated that top plate 282 of air spring piston 242 of the present invention could be utilized either with or without bumper 281, without changing the overall concept or operation of the present invention. It is also contemplated that top plate 282 of air spring 242 of the present invention could be utilized either with or without openings 285, without changing the overall concept or operation of the present invention. It is even further contemplated that preferred embodiment air spring piston 242 of the present invention could be utilized in conjunction with prior art pedestal 130 or other similar pedestals or beam mounting structures, without changing the overall concept or operation of the present invention. It is yet even further contemplated that bottom plate 250 of air spring piston 242 could be adhesively bonded to, mechanically fastened to, attached via other means well known in the art to, or even formed as a part of, the air spring piston, without changing the overall concept or operation of the present invention. It is also understood that preferred embodiment air spring piston 242 of the present invention could be utilized with all types of air springs without changing the overall concept or operation of the present invention.

Accordingly, the piston for an air spring of a heavy-duty vehicle of the present invention is simplified, provides an effective, safe, inexpensive and efficient structure and method which achieves all the enumerated objectives, provides for eliminating difficulties encountered with prior art pistons, and solves problems and obtains new results in the art.

In the foregoing description, certain terms have been used for brevity, clearness and understanding; but no unnecessary limitations are to be implied therefrom beyond the requirements of the prior art, because such terms are used for descriptive purposes and are intended to be broadly construed.

Moreover, the description and illustration of the invention is by way of example, and the scope of the invention is not limited to the exact details shown or described.

Having now described the features, discoveries and principles of the invention, the manner in which the piston for an air spring of a heavy-duty vehicle is used and installed, the characteristics of the construction, arrangement and method steps, and the advantageous, new and useful results obtained; the new and useful structures, devices, elements, arrangements, process, parts and combinations are set forth in the appended claims.

What is claimed is:

1. A piston for an air spring of a heavy duty vehicle, said piston comprising:
   a) a sidewall and a central hub, said sidewall and said central hub made in one piece and attached to a discrete first bottom plate of the piston;
   b) a discrete top plate attached to a top portion of said sidewall and a top portion of said central hub, said top plate including a barb around its circumference;
   c) a second bottom plate formed in said central hub;
   d) said first bottom plate spaced downwardly from said second bottom plate to define a recess in said piston thereby creating increased piston volume relative to the second bottom plate.

2. The piston for an air spring of a heavy-duty vehicle of claim 1, wherein said top plate is formed with at least one opening, said at least one opening communicating with an interior chamber of said piston and an interior chamber of a bellows of said air spring.

3. The piston for an air spring of a heavy-duty vehicle of claim 1, further comprising a bumper disposed on said top plate.

4. The piston for an air spring of a heavy-duty vehicle of claim 1, further comprising said first bottom plate including a pair of concentrically spaced inner and outer tongues extending generally upwardly and aligned with said central hub and said sidewall.

5. The piston for an air spring of a heavy-duty vehicle of claim 4, further comprising a first groove formed in a bottom surface of said sidewall and a second groove formed in a bottom surface of said central hub, said first groove communicating with said outer tongue of said first bottom plate and said second groove communicating with said inner tongue of said first bottom plate.

6. The piston for an air spring of a heavy-duty vehicle of claim 1, wherein said first bottom plate is friction welded to said sidewall and said central hub.

7. The piston for an air spring of a heavy-duty vehicle of claim 1, further comprising a plurality of webs formed between said sidewall and said central hub.

8. The piston for an air spring of a heavy-duty vehicle of claim 1, further comprising a piston mounting pedestal attached to said second bottom plate.

9. The piston for an air spring of a heavy-duty vehicle of claim 8, wherein said piston mounting pedestal is attached to a beam of a suspension assembly of said heavy duty vehicle.

10. The piston for an air spring of a heavy-duty vehicle of claim 1, said piston operatively attached to a bellows of said air spring, said bellows in turn operatively attached to a frame of said heavy-duty vehicle.

11. The piston for an air spring of a heavy-duty vehicle of claim 10, further comprising a bellows top plate attached to a top portion of said bellows.

12. The piston for an air spring of a heavy-duty vehicle of claim 11, wherein said bellows top plate is attached to the frame of said heavy-duty vehicle.

13. The piston for an air spring of a heavy-duty vehicle of claim 11, said piston being formed from plastic.

14. The piston for an air spring of a heavy-duty vehicle of claim 1, wherein said attachment of said top plate to said top portion of said sidewall and said top portion of said central hub is removable.

15. A piston for an air spring of a heavy duty vehicle, said piston comprising:
   a) a sidewall and a central hub, said sidewall and said central hub made in one piece and attached to a discrete first bottom plate of the piston;
   b) a discrete top plate attached to a top portion of said sidewall and a top portion of said central hub, said top plate extending outwardly beyond said top portion of said sidewall to form a barb around the sidewall top portion circumference;
   c) a second bottom plate formed in said central hub;
   d) said first bottom plate spaced downwardly from said second bottom plate to define a recess in said piston thereby creating increased piston volume relative to the second bottom plate.

* * * * *